United States Patent
Gamaley et al.

(10) Patent No.: US 10,104,131 B2
(45) Date of Patent: Oct. 16, 2018

(54) MANAGING SESSION INITIATION PROTOCOL SUBSCRIPTION DIALOG STATE LOSS

(75) Inventors: Vladimir Gamaley, Rehovot (IL); Gili Nachum, Bet-shemesh (IL); Gil Perzy, Holon (IL)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 13/102,338

(22) Filed: May 6, 2011

(65) Prior Publication Data

US 2012/0284321 A1 Nov. 8, 2012

(51) Int. Cl.
G06F 15/16 (2006.01)
H04L 29/06 (2006.01)

(52) U.S. Cl.
CPC ........ H04L 65/105 (2013.01); H04L 65/1006 (2013.01); H04L 65/1073 (2013.01)

(58) Field of Classification Search
CPC H04L 65/1006; H04L 65/105; H04L 65/1073
USPC ....................................................... 709/202
See application file for complete search history.

(56) References Cited

U.S. PATENT DOCUMENTS

| | | | |
|---|---|---|---|
| 7,801,986 B2 | 9/2010 | Lybeck et al. | |
| 2004/0250283 A1* | 12/2004 | Duigenan et al. | 725/60 |
| 2006/0271935 A1 | 11/2006 | Cox et al. | |
| 2007/0011342 A1* | 1/2007 | Rosenberg | 709/230 |
| 2008/0086566 A1 | 4/2008 | Kurarasamy et al. | |
| 2008/0212766 A1 | 9/2008 | Kota et al. | |
| 2009/0010163 A1* | 1/2009 | Isomura et al. | 370/235 |
| 2009/0180378 A1 | 7/2009 | Noel et al. | |
| 2009/0245098 A1 | 10/2009 | Baker et al. | |
| 2009/0319666 A1* | 12/2009 | Liang et al. | 709/227 |
| 2010/0027532 A1 | 2/2010 | Sparks et al. | |
| 2010/0030906 A1 | 2/2010 | Apreutesei et al. | |
| 2010/0107226 A1 | 4/2010 | Grabelsky et al. | |
| 2010/0223492 A1* | 9/2010 | Farrugia et al. | 714/4 |
| 2011/0075653 A1* | 3/2011 | Potts et al. | 370/352 |
| 2011/0122863 A1* | 5/2011 | Balasaygun et al. | 370/352 |
| 2011/0167172 A1* | 7/2011 | Roach et al. | 709/239 |

(Continued)

FOREIGN PATENT DOCUMENTS

CN 101714170 A 5/2010
JP 2009015485 A 1/2009

(Continued)

OTHER PUBLICATIONS

PCT/IB2012/052209 International Search Report and Written Opinion, dated Jul. 24, 2012.

(Continued)

Primary Examiner — June Sison
Assistant Examiner — Steven Nguyen
(74) Attorney, Agent, or Firm — Kunzler, PC

(57) ABSTRACT

Managing Session Initiation Protocol (SIP) subscription dialog state loss, including a SIP server locator configured to determine the identity of a SIP server that maintains a SIP subscription dialog corresponding to a SIP subscription dialog that is maintained by a SIP client, and a liveliness tester configured to periodically send to the SIP server a SIP RE-SUBSCRIBE message corresponding to the SIP subscription dialog.

16 Claims, 5 Drawing Sheets

(56) References Cited

U.S. PATENT DOCUMENTS

2012/0016998 A1* 1/2012 Kumarasamy et al. ...... 709/228
2013/0088989 A1* 4/2013 Noel et al. ................... 370/252

FOREIGN PATENT DOCUMENTS

WO    2010028369       3/2010
WO    2010063863 A1   6/2010

OTHER PUBLICATIONS

Z.Rusinovic et al., "Self-healing Model for SIP-Based Services," Aug. 18, 2009 pp. 375-379.
Intellectual Property Office, "Patents Act 1977: Examination Report under Section 18(3)", www.gov.uk/ipo, Sep. 8, 2017, pp. 1-6.

* cited by examiner

MANAGING SESSION INITIATION PROTOCOL SUBSCRIPTION DIALOG STATE LOSS

BACKGROUND

Field

The subject of the application relates to computer networks in general, and more particularly to providing information to networked entities regarding the status of other networked entities.

Description of the Related Art

The Session Initiation Protocol (SIP) is a protocol for creating, modifying, and terminating computer network-based communication sessions, such as for an Internet-based telephone call between two or more participants. Since its introduction, numerous enhancements to SIP have been proposed, including the SIP Instant Messaging and Presence Leveraging Extensions (SIMPLE) framework in which one or more network entities, such as computer users, send subscription requests to a server, known as a "presence" server, to receive presence information regarding another network entity, referred to as a "presentity." When a change in the presentity's presence information is detected by the presence server, such as when the presentity "publishes" such a change to the presence server, the presence server sends a notification to the subscribers regarding the change.

When a subscription request is made, presence server that handles the subscription forms a subscription dialog that the presence server maintains until the original requestor cancels the subscription or until the subscription expires. The presence server sends notifications to the subscriber regarding any changes to the requested presence information only as long as the subscription dialog is active. Should the subscription dialog become lost or inactive unexpectedly, such as due to failure of the presence server, the subscriber will not know that this has occurred unless some action is taken.

BRIEF SUMMARY

In one aspect of the present invention an apparatus is provided for managing Session Initiation Protocol (SIP) subscription dialog state loss, the apparatus including a SIP server locator configured to determine the identity of a SIP server that maintains a SIP subscription dialog corresponding to a SIP subscription dialog that is maintained by a SIP client, and a liveliness tester configured to periodically send to the SIP server a SIP RE-SUBSCRIBE message corresponding to the SIP subscription dialog. A method and computer-program product embodying the invention are also provided.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
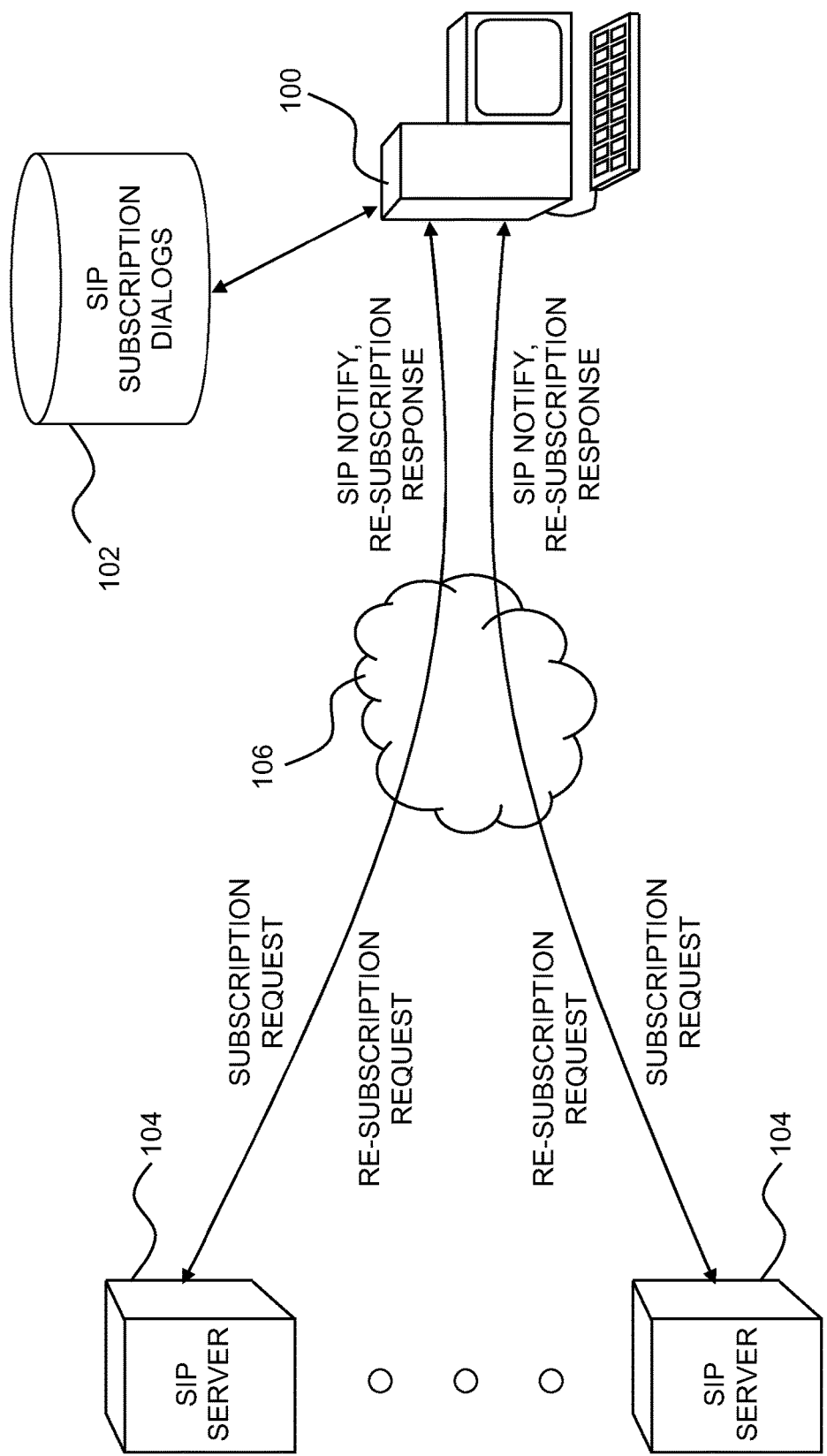
FIGS. 1A and 1B, taken together, is a simplified conceptual illustration of an apparatus for managing SIP subscription dialog state loss.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer-readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer-readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer-readable program code may be stored and/or propagated on in one or more computer-readable medium(s).

The computer-readable medium may be a tangible computer-readable storage medium storing the computer-readable program code. The computer-readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer-readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer-readable storage medium may be any tangible medium that can contain, and/or store computer-readable program code for use by and/or in connection with an instruction execution system, apparatus, or device.

The computer-readable medium may also be a computer-readable signal medium. A computer-readable signal medium may include a propagated data signal with computer-readable program code embodied therein, for example, in baseband or as part of a carrier wave. Such a propagated signal may take any of a variety of forms, including, but not limited to, electrical, electro-magnetic, magnetic, optical, or any suitable combination thereof. A computer-readable signal medium may be any computer-readable medium that is not a computer-readable storage medium and that can communicate, propagate, or transport computer-readable program code for use by or in connection with an instruction execution system, apparatus, or device. Computer-readable program code embodied on a computer-readable signal medium may be transmitted using any appropriate medium, including but not limited to wireline, optical fiber, Radio Frequency (RF), or the like, or any suitable combination of the foregoing In one embodiment, the computer-readable medium may comprise a combination of one or more computer-readable storage mediums and one or more computer-readable signal mediums. For example, computer-readable program code may be both propagated as an electro-magnetic signal through a fiber optic cable for execution by a processor and stored on RAM storage device for execution by the processor.

Computer-readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer-readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer-readable program code. The computer-readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer-readable program code may also be stored in a computer-readable medium that can direct a computer, other programmable data processing apparatus, or other devices to function in a particular manner, such that the instructions stored in the computer-readable medium produce an article of manufacture including instructions which implement the function/act specified in the schematic flowchart diagrams and/or schematic block diagrams block or blocks.

The computer-readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer-readable program code.

Figure 1B:
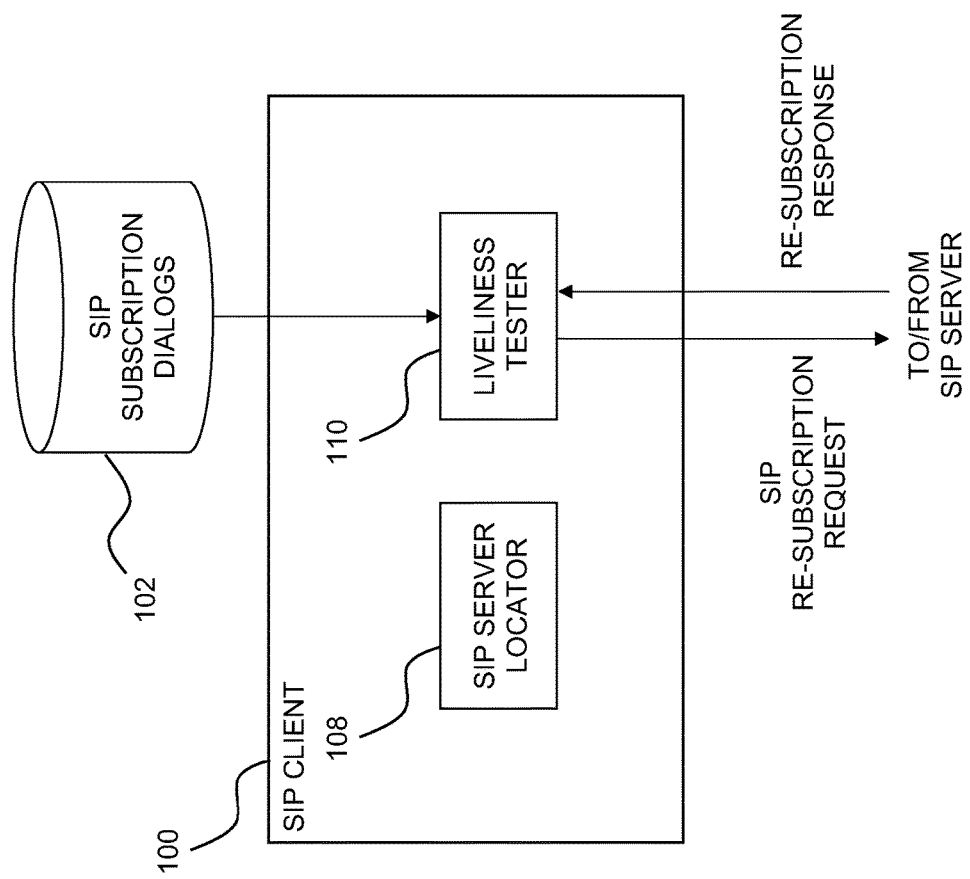

Reference is now made to FIGS. 1A and 1B, which, taken together, is a simplified conceptual illustration of an apparatus for managing SIP subscription dialog state loss, constructed and operative in accordance with an embodiment of the invention. In the system of FIGS. 1A and 1B, a SIP client 100 is shown having a set 102 of SIP subscription dialogs, where each SIP subscription dialog in set 102 corresponds to a SIP subscription dialog maintained by a SIP server among one or more SIP servers 104. The SIP subscription dialogs are typically created in response to corresponding SIP subscription requests sent by SIP client 100 to SIP servers 104 via a communications network 106, such as the Internet.

As is shown more particularly in FIG. 1B, SIP client 100 is preferably configured with a SIP server locator 108 which, for each SIP subscription dialog in set 102, determines the identity of each SIP server 104 that is known to maintain a corresponding SIP subscription dialog, such as where the identity is in the form of a unique network address. SIP client 100 is also preferably configured with a liveliness tester 110 that is configured, for each SIP server 104 that is known to maintain one or more SIP subscription dialogs corresponding to one or more SIP subscription dialogs in set 102 of SIP subscription dialogs, to periodically send a SIP RE-SUBSCRIBE message to the corresponding SIP server 104 for any of the SIP subscription dialogs maintained by the SIP server 104, preferably where the SIP subscription dialog is selected at random.

If a response to the SIP RE-SUBSCRIBE message is received by liveliness tester 110 that indicates that the re-subscription request was successful, then the corresponding SIP server 104 is considered to be properly maintaining its SIP subscription dialogs. Otherwise, such as if no response is received by liveliness tester 110 at all within a predefined time period, or if a response is received by liveliness tester 110 that indicates that the re-subscription request was not successful, then liveliness tester 110 is configured to send multiple SIP RE-SUBSCRIBE messages corresponding to multiple SIP subscription dialogs maintained by the corresponding SIP server 104, such as where a predefined number of SIP subscription dialogs are selected at random. If the responses to the SIP RE-SUBSCRIBE messages that are received by liveliness tester 110 indicate that a predefined re-subscription success rate, such as 80%, has been met, then the corresponding SIP server 104 is considered to be properly maintaining its SIP subscription dialogs. Otherwise, the corresponding SIP server 104 is considered to have lost the state of all of the SIP subscription dialogs that the SIP server was known to have maintained, whereupon corrective action may be taken by SIP client 100, such as by canceling all SIP subscription dialogs in set 102 that are known to be maintained by the corresponding SIP server 104, and reestablishing their underlying subscriptions as desired.

Figure 2:
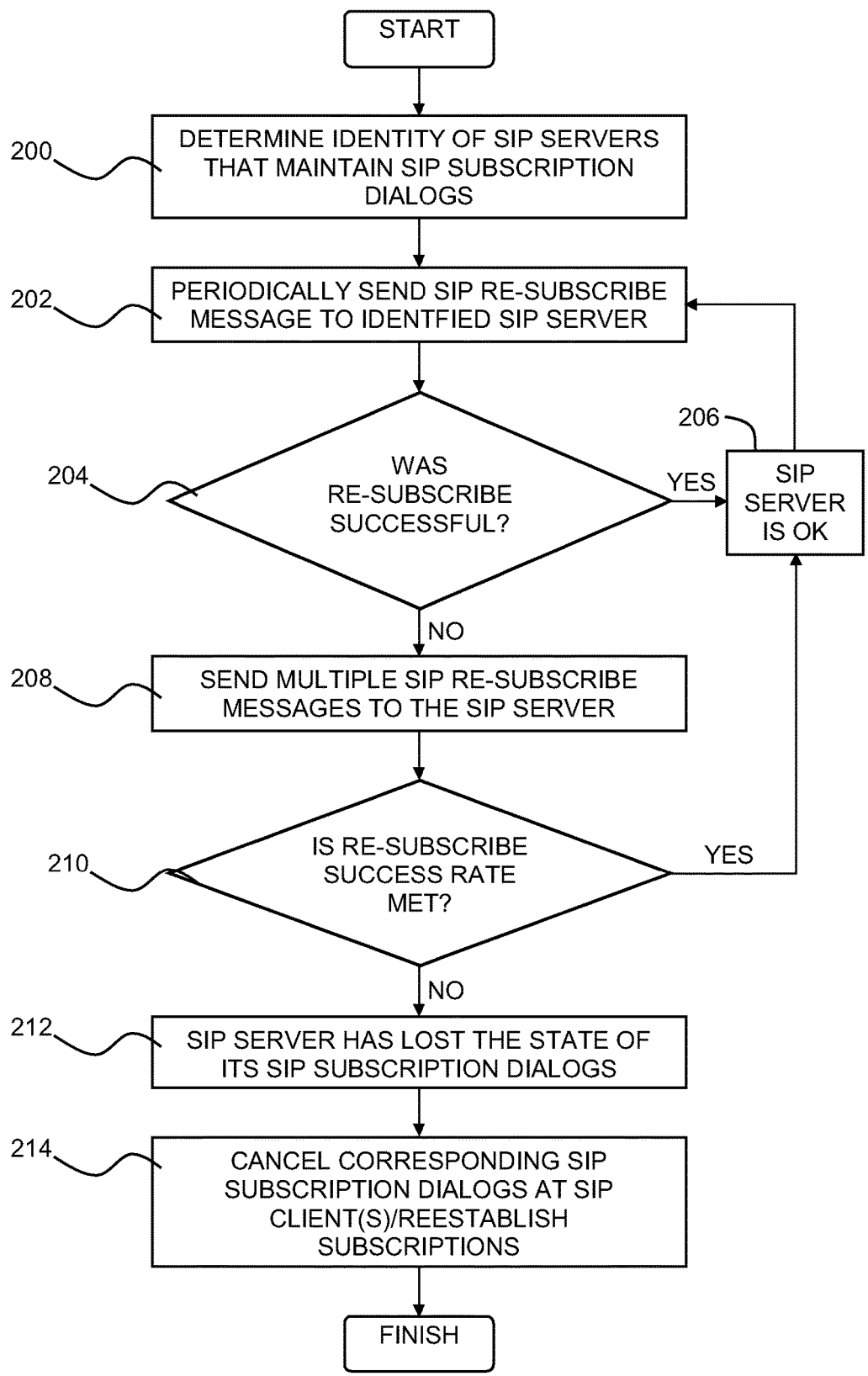
FIG. 2 is a simplified flowchart illustration of an exemplary method of operation of the system of FIG. 1.

Reference is now made to FIG. 2 which is a simplified flowchart illustration of an exemplary method of operation of the system of FIGS. 1A and 1B, operative in accordance with an embodiment of the invention. The description of FIG. 2 refers to elements of FIGS. 1A and 1B. In the method of FIG. 2, for each SIP subscription dialog in a set 102 of SIP subscription dialogs, such as may be maintained by one or more SIP clients on behalf of one or more users, the identity of each SIP server 104 that is known to maintain a corresponding SIP subscription dialog is determined (step 200). The identity of a SIP server 104 may, for example, be determined by inspecting the Via header of an incoming SIP NOTIFY message that is received in connection with a SIP SUBSCRIBE request, as the Via header lines list the servers that the NOTIFY message traversed, where the last Via header line indicates the network address of the SIP server 104 from which the NOTIFY message originated. Thus, in the exemplary NOTIFY message below, the last Via header line indicates that the NOTIFY message originated from a SIP server 104 identified by the IP address 123.456.78.90:

```
Message:
    NOTIFY sip:98.76.54.32:5060;transport=tcp SIP/2.0
    Event: presence
    From:
    <sip:test3@mypc.abc.com>;tag=8507547383532934__Server.-
    1295537940648.0__45__92
    To:
    <sip:test1@hispc.qrs.com>;tag=
    7490190325259244__local.1295537911000__12__18
        Call-ID: 7335004992519621@98.76.54.32
        Max-Forwards: 69
        CSeq: 2 NOTIFY
        Content-Type: application/pidf+xml
        Content-Length: 546
        Subscription-state: active;expires=3599
        Via: SIP/2.0/TCP
    proxy7.ibm.com:5060;branch=z9hG4bK77566528154309
        Via: SIP/2.0/TCP
    123.456.78.90:5064;ibmsid=Server.1295537940648.0__45__92;
    branch=z9hG4bK7 7566528154309
        Contact: <sip:proxy7.ibm.com:5060;transport=tcp>
```

For each SIP server 104 that is known to maintain one or more SIP subscription dialogs corresponding to one or more SIP subscription dialogs in the set 102 of SIP subscription dialogs, a SIP RE-SUBSCRIBE message is periodically sent to the SIP server 104 for any of the SIP subscription dialogs maintained by the SIP server (step 202), preferably where the SIP subscription dialog is selected at random. These SIP RE-SUBSCRIBE messages are preferably sent in accordance with a predefined frequency, such as every 30 seconds. If a response to the SIP RE-SUBSCRIBE message is received that indicates that the re-subscription request was successful (step 204), then the SIP server is considered to be properly maintaining its SIP subscription dialogs (step 206).

Otherwise, such as where no response is received at all within a predefined time period, such as 31 seconds, or if a response is received that indicates that the re-subscription request was not successful, such as having a "481—Call/Transaction Does Not Exist" response code indicating that the SIP subscription dialog state has been lost, or that otherwise indicates that an has error occurred, then the SIP server 104 is further evaluated as follows.

SIP RE-SUBSCRIBE messages corresponding to multiple SIP subscription dialogs maintained by the SIP server 104 are sent to the SIP server 104 (step 208), such as where a predefined number of SIP subscription dialogs are selected at random. If the responses to the SIP RE-SUBSCRIBE messages that are received indicate that a predefined re-subscription success rate, such as 80%, has been met (step 210), then the SIP server 104 is considered to be properly maintaining its SIP subscription dialogs (step 206). Otherwise, the SIP server 104 is considered to have lost the state of all of the SIP subscription dialogs that the SIP server was known to have maintained (step 212), whereupon corrective action may be taken, such as by canceling all corresponding SIP subscription dialogs at SIP clients and reestablishing their underlying subscriptions as desired (step 214).

Figure 3:
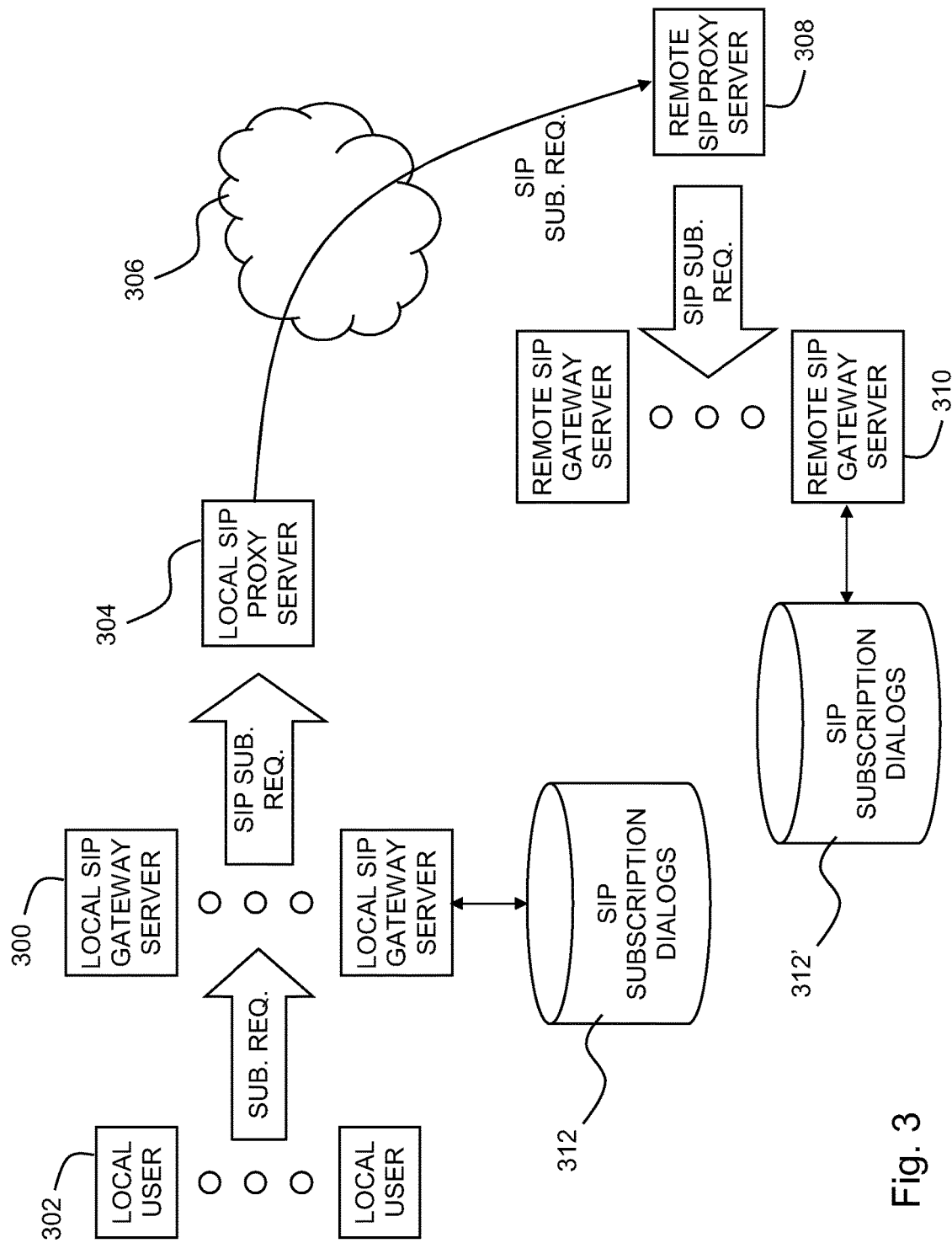
FIG. 3 is a simplified conceptual illustration of an apparatus for managing SIP subscription dialog state loss.

Reference is now made to FIG. 3, which is a simplified conceptual illustration of a system for managing SIP subscription dialog state loss, constructed and operative in accordance with an embodiment of the invention. The description of FIG. 3 refers to elements of FIGS. 1A, 1B, and 2. In the system of FIG. 3, the functionality of SIP client 100 as described hereinabove with reference to FIGS. 1A, 1B, and 2 is embodied in one or more local SIP gateway servers 300 that are configured to receive subscription requests from one or more local users 302, such as is found in systems employing IBM™ Lotus Sametime™, commercially-available from International Business Machines Corporation, Armonk, N.Y. A local SIP gateway server 300 that receives a subscription request from a local user 302 sends a corresponding SIP subscription request, such as via a local SIP proxy server 304, over a communications network 306, such as the Internet, to a remote SIP gateway server 310, such as via a remote SIP proxy server 308, where remote SIP gateway server 310 may be one among multiple remote SIP gateway servers 310. For each subscription, both local SIP gateway server 300 and remote SIP gateway server 310 maintain corresponding SIP subscription dialogs 312 and 312'. Each local SIP gateway server 300 identifies the remote SIP gateway servers 310 that maintain SIP subscription dialogs corresponding to its SIP subscription dialogs, such as by examining SIP Via information in incoming SIP NOTIFY messages received in connection with its previous SIP SUBSCRIBE requests as described above with reference to FIG. 2, and sends SIP RE-SUBSCRIBE messages as described above with reference to FIGS. 1A, 1B, and 2. If a local SIP gateway server 300 determines that a remote SIP gateway server 310 is considered to have lost the state of its SIP subscription dialogs, local SIP gateway server 300 preferably reports this to the other local SIP gateway servers 300, whereupon they may either send their own SIP RE-SUBSCRIBE messages as described above with reference to FIGS. 1A, 1B, and 2, and/or take corrective action, such as by canceling their SIP subscription dialogs that are known to be maintained by the remote SIP gateway server 310, and reestablishing their underlying subscriptions as desired.

Figure 4:
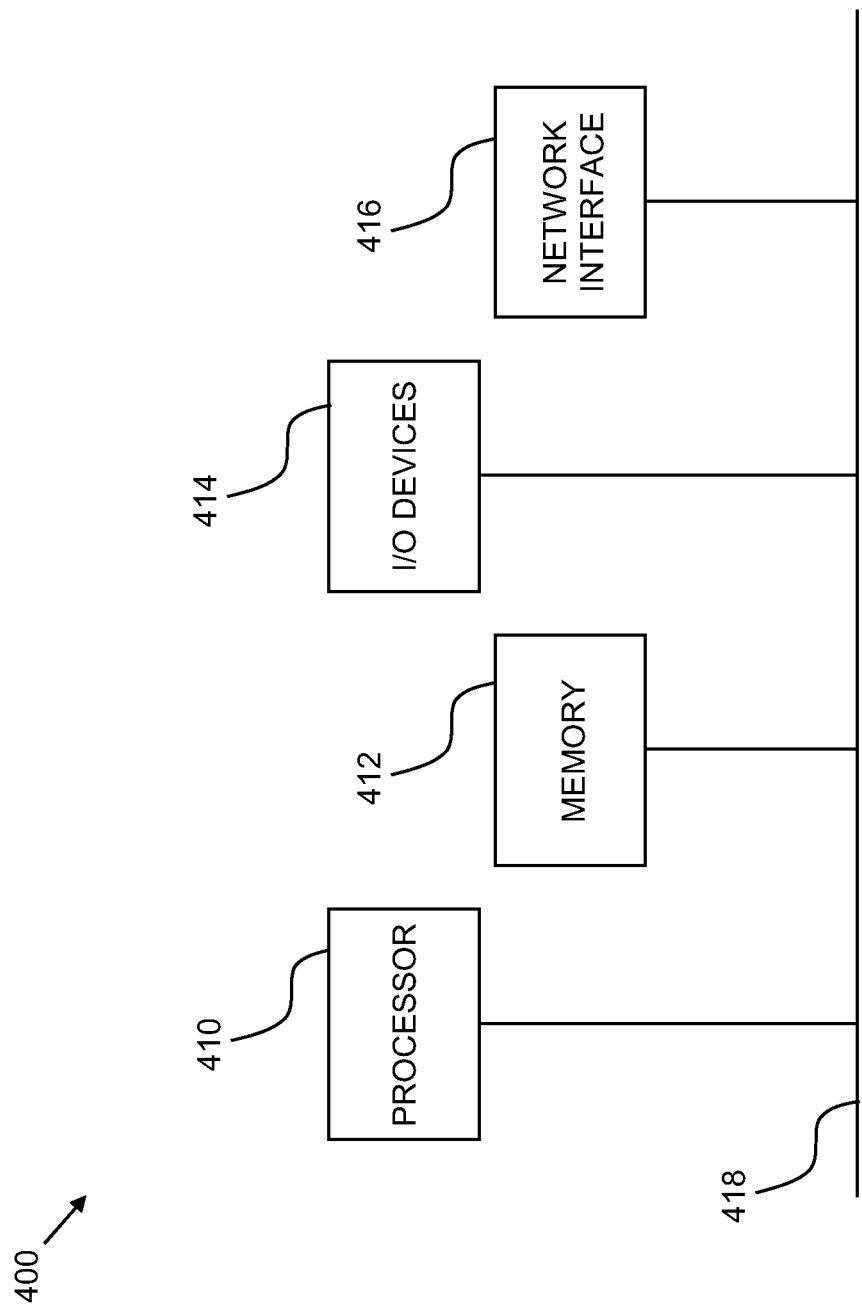
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1A-2) may be implemented, according to an embodiment of the invention.

As shown, the techniques for controlling access to at least one resource may be implemented in accordance with a processor 410, a memory 412, input/output (I/O) devices 414, and a network interface 416, coupled via a computer bus 418 or alternate connection arrangement.

It is to be appreciated that the term "processor" as used herein includes any processing device, such as, for example, one that includes a CPU (central processing unit) and/or other processing circuitry. It is also to be understood that the term "processor" may refer to more than one processing device and that various elements associated with a processor 410 may be shared by other processors 410.

The term "memory" as used herein is intended to include memory associated with a processor or CPU, such as, for example, RAM, ROM, a fixed memory device (e.g., hard drive), a removable memory device (e.g., diskette), flash memory, etc. Such memory 412 may be considered a computer-readable storage medium.

The I/O device 414 as used herein is intended to include, for example, one or more input devices (e.g., keyboard, mouse, scanner, etc.) for entering data to the processing unit, and/or one or more output devices (e.g., speaker, display, printer, etc.) for presenting results associated with the processor 410. The network interface 416 includes any interface port, interface connection, and/or interface medium (e.g.

Ethernet, Token Ring, Bluetooth, Wifi, etc.) for communicating with other processing devices.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computer-readable storage medium having program instructions embodied therewith, the program instructions executable by a processor to cause the processor to;
   randomly select a Session Initiation Protocol (SIP) subscription dialog that is maintained as two corresponding SIP subscription dialogs by a local SIP server and a remote SIP server;
   determine the identity of the remote SIP server that maintains the SIP subscription dialog;
   periodically send to the local SIP server and the remote SIP server a SIP RE-SUBSCRIBE message corresponding to the SIP subscription dialog;
   in the absence of a response to the SIP RE-SUBSCRIBE message that indicates that the re-subscription request was successful, send multiple SIP RE-SUBSCRIBE messages corresponding to multiple SIP subscription dialogs maintained by the local SIP server and the remote SIP server;
   determine if a predefined re-subscription success rate of at least 80 percent of the multiple SIP RE-SUBSCRIBE messages is met, wherein the predefined re-subscription success rate is met if at least 80 percent of the sent multiple SIP RE-SUBSCRIBE messages to the multiple SIP subscription dialogs are responded to successfully;
   cancel all SIP subscription dialogs maintained by the local SIP server and corresponding SIP subscription dialogs maintained by the remote SIP server if the predefined re-subscription success rate is not met; and
   reestablish the SIP subscriptions corresponding to any SIP subscription dialogs maintained by the local SIP server and the remote SIP server in response to the predefined re-subscription success rate not being met.

2. The apparatus according to claim 1, wherein the SIP subscription dialog is randomly selected from a set of SIP subscription dialogs maintained by a SIP client.

3. The apparatus according to claim 2, wherein the processor randomly selects a predefined number of the multiple SIP subscription dialogs from the set of SIP subscription dialogs maintained by the SIP client.

4. The apparatus according to claim 2, wherein the processor reestablishes any SIP subscriptions corresponding to any SIP subscription dialogs maintained by the local SIP server and the remote SIP server if the predefined re-subscription success rate is not met.

5. The apparatus according to claim 1 wherein a SIP server locator and liveliness tester are embodied in the local SIP server that is configured to receive a subscription request from a local user and send a corresponding SIP subscription request to the remote SIP server.

6. A method for managing Session Initiation Protocol (SIP) subscription dialog state loss, the method comprising:
   randomly selecting, by use of a processor, a SIP subscription dialog that is maintained as two corresponding SIP subscription dialogs by a local SIP server and a remote SIP server;
   determining the identity of the remote SIP server that maintains the SIP subscription dialog;
   periodically sending to the local SIP server and the remote server a SIP RE-SUBSCRIBE message corresponding to the SIP subscription dialog;
   in the absence of a response to the SIP RE-SUBSCRIBE message that indicates that the re-subscription request was successful, sending multiple SIP RE-SUBSCRIBE messages corresponding to multiple SIP subscription dialogs maintained by the local SIP server and the remote SIP server;
   determining if a predefined re-subscription success rate of at least 80 percent of the multiple SIP RE-SUBSCRIBE messages is met, wherein the predefined re-subscription success rate is met if at least 80 percent of the sent multiple SIP RE-SUBSCRIBE messages to the multiple SIP subscription dialogs are responded to successfully;
   canceling all SIP subscription dialogs maintained by the local SIP server and corresponding SIP subscription dialogs maintained by the remote SIP server if the predefined re-subscription success rate is not met; and
   reestablishing the SIP subscriptions corresponding to any SIP subscription dialogs maintained by the local SIP server and the remote SIP server in response to the predefined re-subscription success rate not being met.

7. The method according to claim 6, wherein the SIP subscription dialog is randomly selected from a set of SIP subscription dialogs maintained by a SIP client.

8. The method according to claim 7, further comprising randomly selecting a predefined number of the multiple SIP subscription dialogs from the set of SIP subscription dialogs maintained by the SIP client.

9. The method according to claim 6, further comprising reestablishing any SIP subscriptions corresponding to any SIP subscription dialogs maintained by the local SIP server and the remote SIP server for the SIP client if the predefined re-subscription success rate is not met.

10. The method according to claim 6 wherein a SIP server locator and liveliness tester are embodied in the local SIP server that is configured to receive a subscription request from a local user and send a corresponding SIP subscription request to the remote SIP server.

11. A computer program product for managing Session Initiation Protocol (SIP) subscription dialog state loss, the computer program product comprising a computer-readable storage medium having program instructions embodied therewith, wherein the computer readable storage medium is not a transitory signal per se, the program instructions executable by a processor to cause the processor to perform a method comprising:

randomly select a SIP subscription dialog that is maintained as two corresponding SIP subscription dialogs by a local SIP server and a remote SIP server;

determine the identity of the remote SIP server that maintains the SIP subscription dialog;

periodically send to the local SIP server and the remote SIP server a SIP RE-SUBSCRIBE message corresponding to the SIP subscription dialog;

in the absence of a response to the SIP RE-SUBSCRIBE message that indicates that the re-subscription request was successful, send multiple SIP RE-SUBSCRIBE messages corresponding to multiple SIP subscription dialogs maintained by the local SIP server and the remote SIP server;

determine if a predefined re-subscription success rate of at least 80 percent of the multiple SIP RE-SUBSCRIBE messages is met, wherein the predefined re-subscription success rate is met if at least 80 percent of the sent multiple SIP RE-SUBSCRIBE messages to the multiple SIP subscription dialogs are responded to successfully; and cancel all SIP subscription dialogs maintained by the local SIP server and corresponding SIP subscription dialogs maintained by the remote SIP server if the predefined re-subscription success rate is not met; and reestablish the SIP subscriptions corresponding to any SIP subscription dialogs maintained by the local SIP server and the remote SIP server in response to the predefined re-subscription success rate not being met.

12. The computer program product according to claim 11, wherein the SIP subscription dialog is randomly selected from a set of SIP subscription dialogs maintained by a SIP client.

13. The computer program product according to claim 12, wherein the method randomly selects a predefined number of the multiple SIP subscription dialogs from the set of SIP subscription dialogs maintained by the SIP client.

14. The computer program product according to claim 12, wherein the method reestablishes any SIP subscriptions corresponding to any SIP subscription dialogs maintained by the local SIP server and the remote SIP server if the predefined re-subscription success rate is not met.

15. The computer program product according to claim 11 wherein the computer-readable program code is executed by the local SIP server that is configured to receive a subscription request from a local user and send a corresponding SIP subscription request to the remote SIP server.

16. A method for integrating a computer program product, comprising integrating computer-readable program instructions into a computer-readable storage medium of a computing system, wherein the computer readable storage medium is not a transitory signal per se, the program instructions executable by the computing system to perform a method comprising:

randomly select a Session Initiation Protocol (SIP) subscription dialog that is maintained as two corresponding SIP subscription dialogs by a local SIP server and a remote SIP server;

determine the identity of the remote SIP server that maintains the SIP subscription dialog;

periodically send to the local SIP server and a remote SIP server a SIP RE-SUBSCRIBE message corresponding to the SIP subscription dialog;

in the absence of a response to the SIP RE-SUBSCRIBE message that indicates that the re-subscription request was successful, send multiple SIP RE-SUBSCRIBE messages corresponding to multiple SIP subscription dialogs maintained by the local SIP server and the remote SIP server;

determine if a predefined re-subscription success rate of at least 80 percent of the multiple SIP RE-SUBSCRIBE messages is met, wherein the predefined re-subscription success rate is met if at least 80 percent of the sent multiple SIP RE-SUBSCRIBE messages to the multiple SIP subscription dialogs are responded to successfully;

cancel all SIP subscription dialogs maintained by the SIP server for the local SIP client and corresponding SIP subscription dialogs maintained by the remote SIP server if the predefined re-subscription success rate is not met; and reestablish the SIP subscriptions corresponding to any SIP subscription dialogs maintained by the local SIP server and the remote SIP server in response to the predefined re-subscription success rate not being met.

* * * * *